(12) United States Patent
Furuichi et al.

(10) Patent No.: US 10,268,528 B2
(45) Date of Patent: Apr. 23, 2019

(54) INFORMATION SHARING AMONG MOBILE APPARATUS

(71) Applicant: International Business Machines Corporation, Armonk, NY (US)

(72) Inventors: Sanehiro Furuichi, Tokyo (JP); Norie Iwasaki, Fujisawa (JP); Masami Tada, Sagamihara (JP); Takahito Tashiro, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/813,229

(22) Filed: Nov. 15, 2017

(65) Prior Publication Data
US 2018/0276055 A1 Sep. 27, 2018

Related U.S. Application Data

(63) Continuation of application No. 15/466,390, filed on Mar. 22, 2017.

(51) Int. Cl.
*G06F 9/44* (2018.01)
*G06F 9/54* (2006.01)

(52) U.S. Cl.
CPC .................................. *G06F 9/542* (2013.01)

(58) Field of Classification Search
CPC ....................................................... G06F 9/542
USPC ........................................................ 719/318
See application file for complete search history.

(56) References Cited

U.S. PATENT DOCUMENTS

| | | | |
|---|---|---|---|
| 2008/0182724 A1* | 7/2008 | Guthrie | A61B 5/1118 482/8 |
| 2015/0012152 A1 | 1/2015 | Ricci | |
| 2016/0103522 A1* | 4/2016 | Lo | G06F 3/044 345/174 |
| 2016/0203522 A1 | 7/2016 | Shiffert et al. | |
| 2018/0276054 A1 | 9/2018 | Furuichi et al. | |

FOREIGN PATENT DOCUMENTS

CN 105590459 A 5/2016

OTHER PUBLICATIONS

Furuichi et al., "Information Sharing Amoing Mobile Apparatus", filed Mar. 22, 2017, U.S. Appl. No. 15/466,390, 55 pages.
List of IBM Patents Treated as Related, Nov. 15, 2017, 2 pages.
Office Action, dated Jun. 28, 2018, regarding U.S. Appl. No. 15/466,390, 11 pages.

* cited by examiner

*Primary Examiner* — Andy Ho
(74) *Attorney, Agent, or Firm* — Yee & Associates, P.C.; Jeffrey S. LaBaw

(57) ABSTRACT

A method executed by a mobile apparatus for verifying event information to be shared is disclosed. The method includes communicating with a nearby mobile or immobile apparatus to generate a verification in response to encountering the nearby mobile or immobile apparatus. The method also includes verifying existence of an incident event in response to arriving at a place of the incident event. The method further includes publishing a verified incident event in order to add into an incident event distributed ledger used for managing event information related to the incident event.

13 Claims, 13 Drawing Sheets

INFORMATION SHARING AMONG MOBILE APPARATUS

RELATED APPLICATIONS

The present application is a continuation application of U.S. patent application Ser. No. 15/466,390, filed on Mar. 22, 2017, entitled INFORMATION SHARING AMONG MOBILE APPARATUS.

BACKGROUND

1. Field

The present invention relates generally to information sharing techniques, and more particularly, to sharing of event information among a plurality of mobile apparatus.

2. Description of the Related Art

The Internet of Things (or IoT) is the internetworking of connected physical objects, such as devices, vehicles, buildings and other items, which are embedded with electronics, software, sensors, actuators, and network connectivity that enable these objects to collect and exchange data. Connected objects can be sensed and/or controlled remotely across existing network infrastructure, integrating connected physical objects into computer-based systems. Connected physical objects are uniquely identifiable through their embedded computing system, allowing the connected physical objects to interoperate within the existing Internet infrastructure.

In response to recent advances in IoT related technologies, platforms have been developed in which road hazard information, weather information, environmental information and the like are collected from running vehicles. By delivering the collected information to nearby vehicles or computing nodes, the platform utilizes collected information for map information updates and dynamic route navigations.

In typical platform configurations, the collected information may be managed by a specific service provider in a centralized manner. However, the service provider has no way of validating reliability of reported information for the service provider. Also, a centralized service provider platform has difficulty immediately responding to state changes of incident events, such as the elimination of obstructions and escalation of restrictions. Operational costs for the centralized management may be considerably high. Furthermore, there may be a risk of information manipulation.

Cryptocurrency and smart contract technologies have been developed in which transactions or contracts are conducted through a peer-to-peer network among unspecified nodes without providing any trusted third parties for verifying the transactions or contracts. In these cryptocurrencies, a transaction history may be shared in the peer-to-peer network. Falsification of the past transaction history and a duplicate payment may be prevented on the basis of distributed ledger technology and proof-of-work, state, or burn model. The distributed ledger technology provides a technique for obtaining consensus in a group on the authenticity of transactions without participation of a third-party organization.

SUMMARY

According to an embodiment of the present invention, a computer-implemented method is provided for verifying event information to be shared by a mobile apparatus. The mobile apparatus communicates with a nearby mobile or immobile apparatus to generate a verification in response to encountering the nearby mobile or immobile apparatus. The mobile apparatus verifies an existence of an incident event in response to arriving at a place of the incident event. The mobile apparatus publishes a verified incident event in order to add into an incident event distributed ledger that is used for managing event information related to the incident event.

According to another embodiment of the present invention there is provided a method executed by an information verifier for verifying event information to be shared among a plurality of mobile apparatus. The method includes receiving an event notification issued from an information provider of the plurality of the mobile apparatus. The method also includes verifying one or more event notifications relating to an incident event. The method further includes creating a verified event block that constitutes an event management distributed ledger associated with an account, in which the account is used for collecting rewards from one or more information subscribers of the plurality of the mobile apparatus. In the method, at least part of the reward collected into the account is distributed to the information verifier in response to clearance of the incident event.

According to yet another embodiment of the present invention there is provided a method executed by an information provider for providing event information to be shared among a plurality of mobile apparatus, in which the information provider is one of the plurality of the mobile apparatus. The method includes issuing an event notification for verification through a network in response to detecting a local event. The method also includes receiving a reference request for event information about the local event from an information subscriber of the plurality of the mobile apparatus. The method further includes confirming whether or not a reward has been remitted from the information subscriber to an account, in which the account is associated with an event management distributed ledger for the local event. The method includes further providing event content of the event notification to the information subscriber in response to confirming that the reward has been remitted to the account.

Further, according to still another embodiment of the present invention there is provided a mobile apparatus for sharing event information, in which the mobile apparatus includes a memory, tangibly storing program instructions; and a processor in communication with the memory. By executing the program instructions, the processor is configured to select a remote incident event of interest, in which the remote incident event is associated with a first event management distributed ledger and a first account. The processor is also configured to pay rewards for provision of event information about the remote incident event to the first account. The processor is further configured to send a first reference request to a first other mobile apparatus, in which the first other mobile apparatus is recorded in an existing verified event block of the first event management distributed ledger. Further the processer is configured to receive event content relating to the remote incident event from the first other mobile apparatus.

According to another embodiment of the present invention there is provided a computer system for verifying event information to be shared among a plurality of mobile apparatus, in which the computer system includes a memory, tangibly storing program instructions; and a processor in communication with the memory. By executing the program instructions, the processor is configured to receive an event notification issued from an information provider of the plurality of the mobile apparatus. The processor is also configured to verify one or more event notifications relating to an incident event. The processor is further configured to create a verified event block that constitutes an event management distributed ledger associated with an account, in which the account is used for collecting rewards from one or more information subscribers of the plurality of the mobile apparatus. At least part of the reward collected into the account is distributed to the computer system in response to clearance of the incident event.

According to a further embodiment of the present invention there is provided a computer program product for sharing event information, in which the computer program product includes a computer-readable storage medium having program instructions embodied therewith. The program instructions are executable by a computing node to cause the computing node to issue a detected event notification for verification through a network in response to detecting a local event. The program instructions are also executable to cause the computing node to provide event content of a requested event notification after confirming that reward for provision of the event information to a first account has been remitted, in which the first account is associated with a first event management distributed ledger. The program instructions are executable to cause the computing node further to send a reference request to an issuer of an verified event notification recorded in a second event management distributed ledger for managing a target incident event after paying rewards to a second account associated with the second event management distributed ledger.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
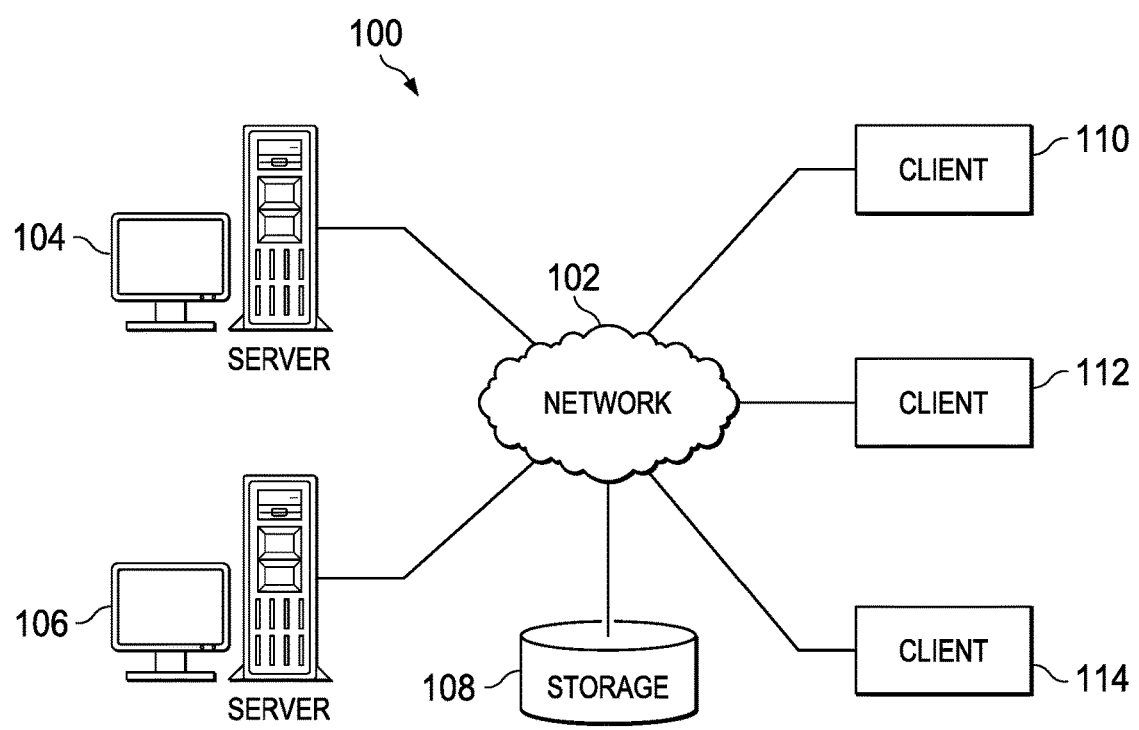
FIG. 1 is a depiction of a pictorial representation of a network of data processing systems in which illustrative embodiments may be implemented.

The present invention may be a system, a method, and/or a computer program product at any possible technical detail level of integration. The computer program product may include a computer-readable storage medium or media, having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing devices. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing devices. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowcharts and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function or act specified in the flowcharts and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions or acts specified in the flowcharts and/or block diagram block or blocks.

The flowchart and block diagrams in the figures illustrate the architecture, functionality, and operation of possible implementations of systems, methods, and computer program products according to various embodiments of the present invention. In this regard, each block in the flowcharts or block diagrams may represent a module, a segment, or a portion of instructions, which comprises one or more executable instructions for implementing the specified logical function or functions. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Hereinafter, referring to the series of FIGS. 1-10, event information sharing systems and processes for sharing event information among a plurality of mobile apparatus according to an exemplary embodiment of the present invention will be described. More specifically, referring to FIG. 1 and FIG. 2, an overview and a perspective picture of an event information sharing system will be described. Next, referring to FIG. 3 and FIG. 4, schematics of components implemented on a mobile apparatus and a computing node, which may be devices constituting the event information sharing system, will be described. Then, referring to the series of FIGS. 5-10, processes for detecting event information, verifying event information, validating event information, and verifying and validating verification for event information sharing will be described in detail.

Furthermore, referring to FIGS. 11A and 11B, mobile apparatus according to two other exemplary embodiments of the present invention will be described. Finally, referring to FIG. 12, a hardware configuration of a computer system according to one or more embodiments of the present invention will be described.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114. In this example, clients 110, 112, and 114 each represent a mobile apparatus for verifying event information to be shared among clients 110, 112, and 114.

In addition, it should be noted that network data processing system 100 may include any number of additional servers, clients, storage devices, and other devices not shown. Program code located in network data processing system 100 may be stored on a computer-readable storage medium and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
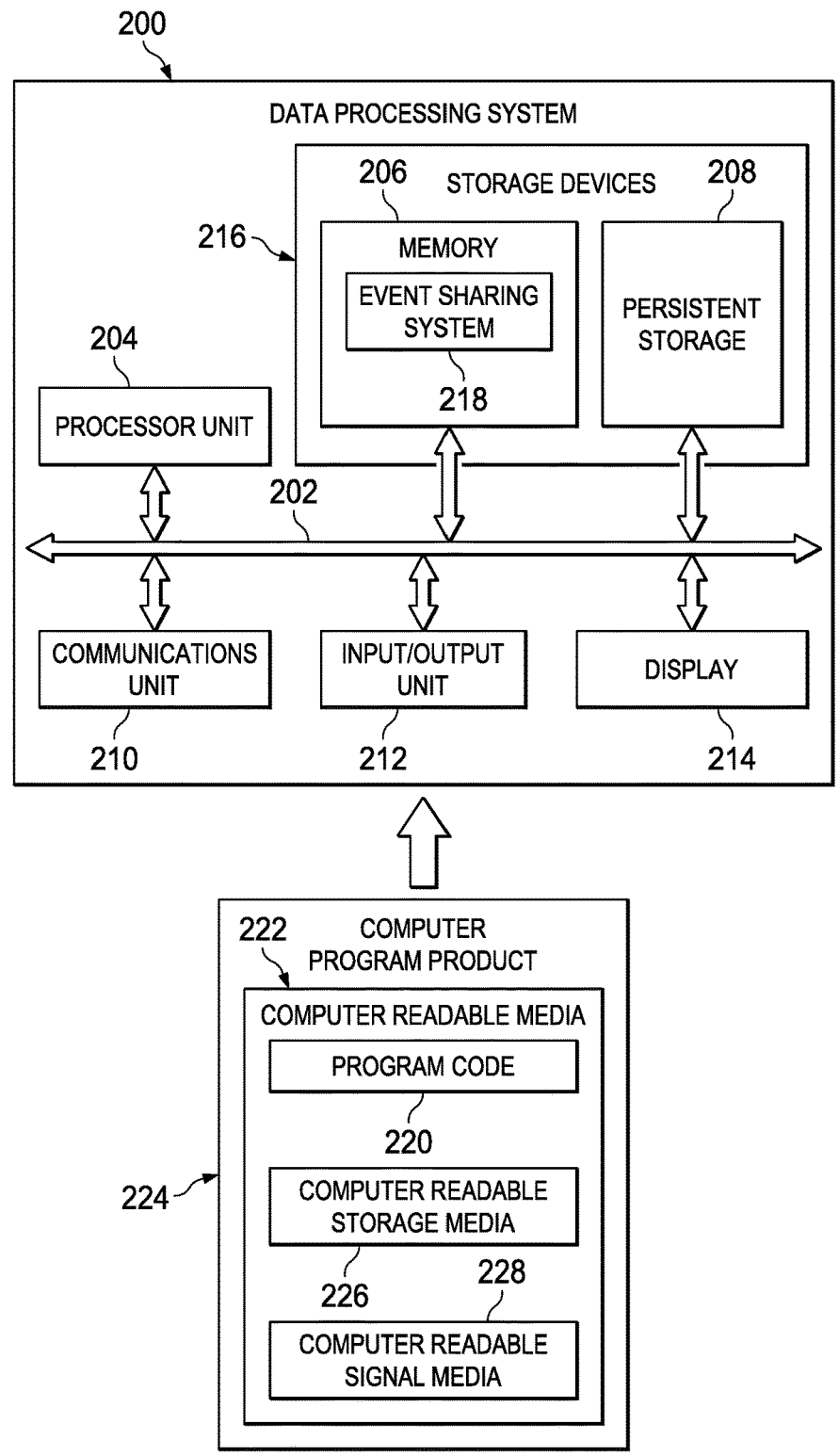
FIG. 2 is a diagram of a data processing system depicted in accordance with an illustrative embodiment.

With reference now to FIG. 2, a diagram of a data processing system is depicted in accordance with an illustrative embodiment. Data processing system 200 is an example of a computer, such as servers 104 and 106 and clients 110, 112, and 114 in FIG. 1, in which computer-readable program code or instructions implementing processes of the illustrative embodiments may be located. In this illustrative example, data processing system 200 includes communications fabric 202, which provides communications between processor unit 204, memory 206, persistent storage 208, communications unit 210, input/output unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, memory 206 stores event information sharing system 218. However, it should be noted that even though event information sharing system 218 is illustrated as residing in persistent storage 208, in an alternative illustrative embodiment event information sharing system 218 may be a separate component of data processing system 200. For example, event information sharing system 218 may be a hardware component coupled to communications fabric 202 or a combination of hardware and software components.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, a cable, an universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer-usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200. In some instances, computer-readable storage media 226 may not be removable from data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 220 may be downloaded over a network to persistent storage 208 from another device or data processing system through computer-readable signal media 228 for use within data processing system 200. For instance, program code stored in a computer-readable storage media in a data processing system may be downloaded over a network from the data processing system to data processing system 200. The data processing system providing program code 220 may be a server computer, a client computer, or some other device capable of storing and transmitting program code 220.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer-readable storage device in data processing system 200 is any hardware apparatus that may store data. Memory 206, persistent storage 208, and computer-readable storage media 226 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
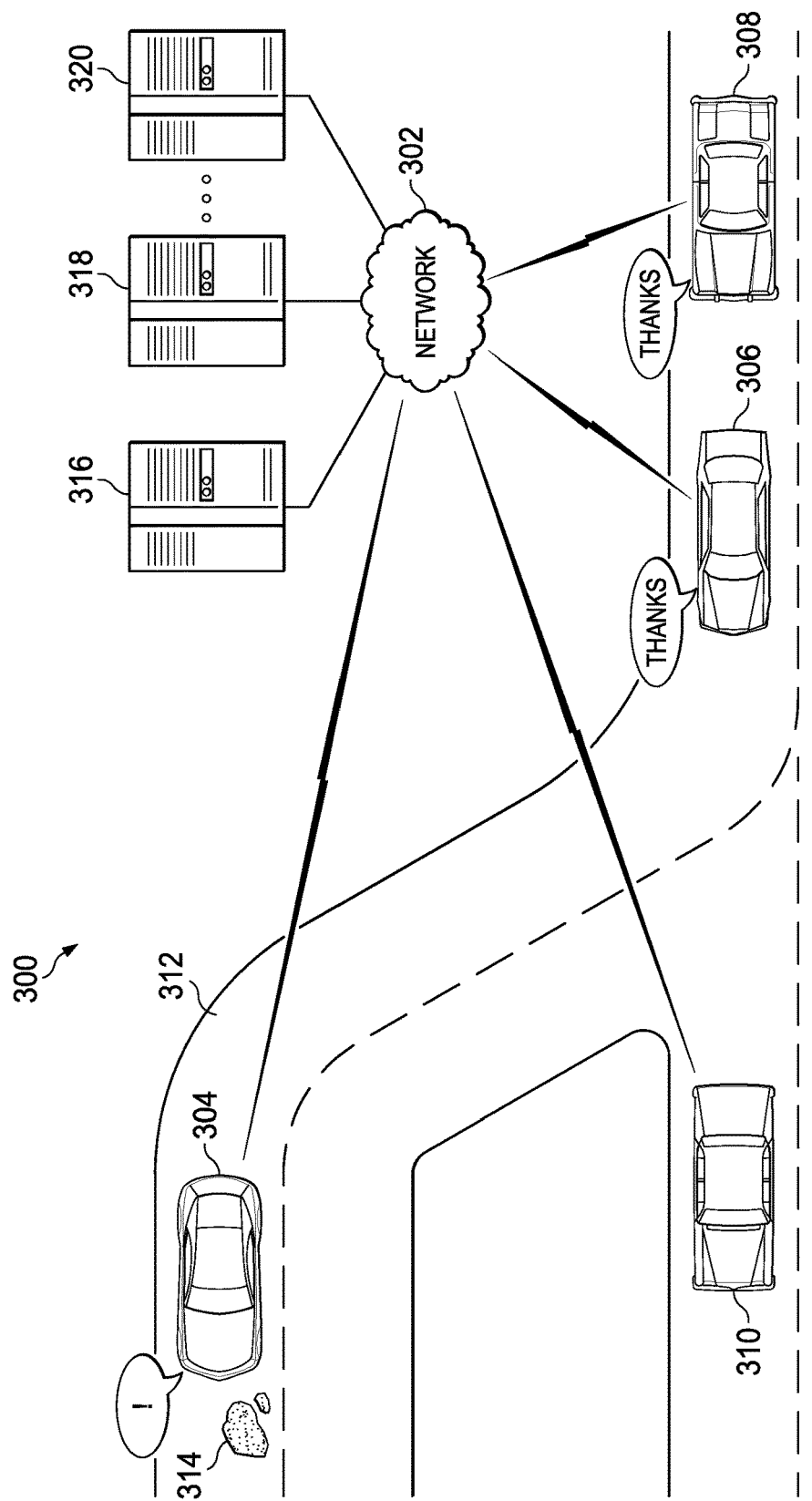
FIG. 3 is a schematic view of an exemplary event information sharing environment in which illustrative embodiments may be implemented.

With reference now to FIG. 3, a schematic view of exemplary event information sharing environment is illustrated in which illustrative embodiments may be implemented. Event information sharing environment 300 can share information over network 302, which is an example of network 102 of FIG. 1.

Network 302 may include any kind of wired and/or wireless network infrastructures including internet, local, wide, or metropolitan area network, etc. In this illustrative embodiment, network 302 establishes a peer-to-peer network (hereinafter, referred to as the P2P network) for efficiently sharing geographically-dependent events and data in a blockchain format without depending on a trusted third party for verification.

As depicted, event information sharing environment 300 includes vehicles 304, 306, 308, and 310. Vehicles 304, 306, 308, and 310 may be equipped with a mobile communications unit for connecting to network 302 through wireless communications. Each of vehicles 304, 306, 308, and 310 may be an example of one of clients 110, 112, and 114 of FIG. 1. Each of vehicles 304, 306, 308, and 310 may travel its own route along road 312.

In one illustrative example, vehicle 304 encounters event 314 on road 312. Event 314 is an event detectable by vehicle 304. Note that event 314 is one of many possible incident events that can be detected by vehicle 304. Detected events may include events such as, but not limited to, an obstruction of on road 312, an accident on road 312, a broken vehicle in road 312, construction work on road 312, freezing conditions on road 312, flooding conditions on road 312, a restriction of road 312, a blockage or closing of road 312, a speed limitation on road 312, a snow chain regulation on road 312, a one-way alternating traffic event on road 312, as well as other suitable types of events. The detectable incident events may include traffic condition information, such as, but not limited to, congested condition information, crowded condition information, smooth condition information, as well as other suitable types of information. The detectable incident events may include business information, such as, but not limited to, information about the opening/closing of shops, and information about parking status, as well as other suitable information.

Vehicle 304 can share information regarding event 314 with vehicles 306, 308, and 310 through network 302. Information regarding event 314 may be useful for vehicles 306, and 308 that travel along road 312 with its own route similar to that of vehicle 304. Therefore, vehicles 306 and 308 may be interested in information regarding event 314 detected by vehicle 304. On the other hand, vehicle 310 that travels along road 312 with a route different from that of vehicle 304 may not be interested in the information regarding event 314.

In the exemplary embodiment, such geographically-dependent information can be shared among vehicles 304, 306, 308, and 310 through network 302 in a decentralized manner by using an event information sharing system. In the event information sharing system, according to the exemplary embodiment, sharing of the event information may be achieved by using a distributed ledger dedicated for sharing information about event 314.

In an exemplary embodiment, vehicles 306, 308, and 310 run on road 312 along their own routes that pass nearby the location of event 314. One or more of vehicles 306, 308, and 310 can verify information regarding event 314 detected by vehicle 304.

In the exemplary embodiment, the verification of event 314 by one or more of vehicles 306, 308, and 310 may be managed by using a distributed ledger dedicated for verification management in event information sharing environment 300. In this exemplary embodiment, blockchains are employed as the distributed ledgers used for the event information sharing and verification management. However, any other distributed ledger having a data structure other than a chain structure may also be employed as both or either of the distributed ledgers.

In the exemplary embodiment shown in FIG. 3, the mobile apparatus participating in the event information sharing may be a ground vehicle such as an automotive. However, the mobile apparatus may not be limited to the ground vehicle sketched in FIG. 3, and other types of vehicles, including aircraft such as unmanned aerial vehicle (drone), watercraft such as ship, and human-powered vehicles such as bicycle, on-vehicle computing device of aforementioned vehicle, and portable apparatus such as a mobile phone, a mobile computer, etc., may also be used as the mobile apparatus.

Event information sharing environment 300 further includes computing nodes 316, 318, and 320 connected to network 302. Each of computing nodes 316, 318, and 320 can be a server, such as servers 104 and 106 of FIG. 1. Computing nodes 316, 318, and 320 may participate in processing relating to the blockchains, which may include validation of event information submitted by vehicle 304 regarding event 314, and validation and verification of the event verification submitted by one or more of vehicles 306, 308, and 310 regarding event 314. Computing nodes 316, 318, and 320 may be in any known general purpose computers including a personal computer, a workstation, a computer cluster, a mainframe, etc. and/or special purpose computers having specialized hardware such as FPGA (Field Programmable Gate Array) and/or ASIC (Application Specific Integrated Circuit).

Figure 4:
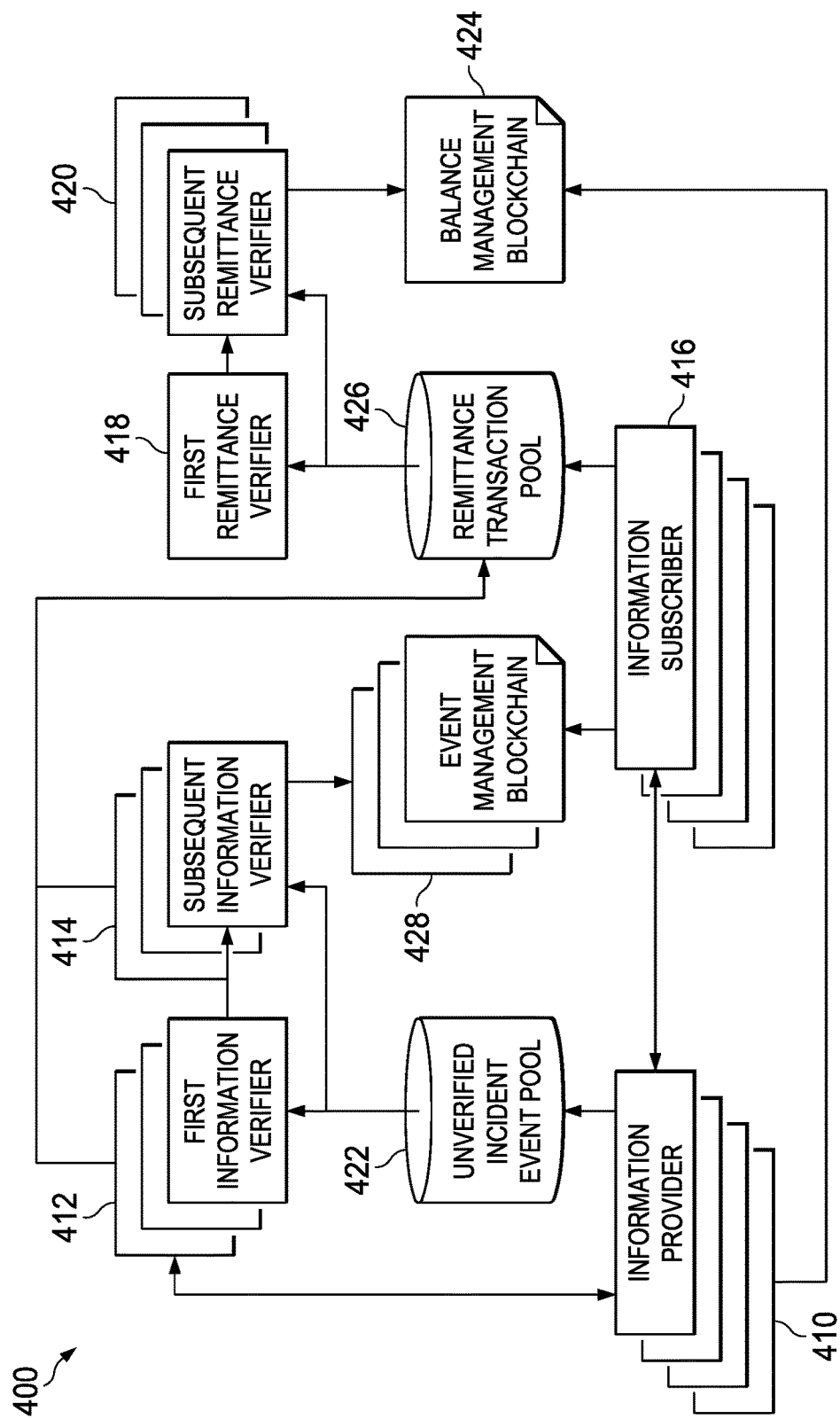
FIG. 4 is a block diagram of an event information sharing system illustrated according to an illustrative embodiment.

With reference now to FIG. 4, a block diagram of an event information sharing system is illustrated according to an illustrative embodiment. Event information sharing system 400 is an example of event information sharing system 218 of FIG. 2.

In this illustrative example, event information sharing system 400 includes a number of different components. In this illustrative example, components of event information sharing system 400 are roles that can be performed by a connected moving object within an event information sharing environment, such as vehicles 304, 306, 308, and 310 of event information sharing environment 300 of FIG. 3. As depicted, event information sharing system 400 includes one or more information provider 410, one or more first information verifier 412, one or more subsequent information verifier 414, one or more information subscriber 416, one or more first remittance verifier 418, and one or more subsequent remittance verifier 420.

In one illustrative example, each participant in event information sharing system 400, including information provider 410, first information verifier 412, subsequent information verifier 414, information subscriber 416, first remittance verifier 418, subsequent remittance verifier 420, are associated with a balance of virtual currency that can be used to access event information within event information sharing system 400.

Balance management blockchain 424 is a distributed ledger dedicated for management of fees and rewards of virtual currency for participation in event information sharing system 400. In this exemplary embodiment, blockchains are employed as the distributed ledgers used for the event information sharing and verification management. However, any other distributed ledger having a data structure other than a chain structure may also be employed as both or either of the distributed ledgers.

In this illustrative example, information provider 410 can be vehicle 304 of FIG. 3. Information provider 410 may detect an incident event, such as event 314 of FIG. 3. Information provider 410 may issue an incident event transaction of the detected incident event through network 302 of FIG. 3 when detecting the incident event so as to notify other nearby vehicles of the incident event. Each incident event transaction may include information describing the incident event, including but not limited to, an event content of the incident event, a location of the incident event, a time of detection of the incident event, and a digital signature of information provider 410.

Event information sharing system 400 stores the incident event transaction issued by information provider 410 as an unverified event in unverified incident event pool 422. Unverified incident event pool 422 is a storage device, such as storage 108 of FIG. 1. Unverified incident event pool 422 temporarily stores the incident event transaction associated with the location of the incident event. There is a possibility that multiple event notification transactions for the same event can be submitted by another moving object acting as information provider 410. In this manner, one or more incident event transactions corresponding to an identical event may be issued from multiple information provider 410.

Based on the issuance of the incident event transaction, information provider 410 earns an information provision reward of virtual currency. However, as will be discussed later in further detail, the reward amount is not yet determined at this time point. Instead, the reward amount is based upon information subscriber 416 requesting content of the event. In the absence of information subscriber 416 requesting content of the event, there is a possibility of no reward.

In this illustrative example, first information verifier 412 can be vehicle 306 of FIG. 3. First information verifier 412 may verify the existence of the unverified incident event issued by information provider 410. In response to encountering the incident event, first information verifier 412 generates an event verification that verifies the validity of the corresponding unverified event in unverified incident event pool 422.

In this illustrative example, first information verifier 412 issues a remittance transaction through network 302 of FIG. 3, which is stored in remittance transaction pool 426. If there is no existing blockchain for the incident event, a new blockchain for the incident event is generated and stored within remittance transaction pool 426.

Remittance transaction pool 426 is a storage device, such as storage 108 of FIG. 1, which stores a distributed ledger dedicated for management of fees and rewards of virtual currency for each incident event. In this exemplary embodiment, blockchains are employed as the distributed ledgers used for the event information sharing and verification management. However, any other distributed ledger having a data structure other than a chain structure may also be employed as both or either of the distributed ledgers.

In this illustrative example, the remittance transaction issued by first information verifier 412 is for the concession of virtual currency for participating in the verification of the incident event. Before the remittance transaction is added to the associated blockchain for the incident event, the remittance transaction is verified by remittance verifier 418.

In this illustrative example, first remittance verifier 418 can be one or more of vehicle 304, 308 and 310 of FIG. 3. First remittance verifier 418 verifies the remittance transactions issued by first information verifier 412 by ensuring that first information verifier 412 has sufficient virtual currency, as indicated by balance management blockchain 424 of first information verifier 412, to cover the concession of for participating in the verification of the incident event. After ensuring sufficient funds and validating the remittance transaction, first remittance verifier 418 generates a new block for the remittance transaction. First remittance verifier 418 sends the block to subsequent remittance verifier 420.

In this illustrative example, subsequent remittance verifier 420 can be one or more of vehicle 304, 308 and 310 of FIG. 3. Subsequent remittance verifier 420 evaluates the validity of the remittance block from first remittance verifier 418. If subsequent remittance verifier 420 determines the remittance block from first remittance verifier 418 to be a valid block, subsequent remittance verifier 420 adds the block to balance management blockchain 424 of information provider 410, first information verifier 412, and remittance transaction pool 426.

First information verifier 412 may verify the existence of the unverified incident event issued by information provider 410. In response to encountering the incident event, first information verifier 412 generates an event verification that verifies the validity of the corresponding unverified event in unverified incident event pool 422.

After the concession money remittance transaction is added to balance management blockchain 424, information verifiers 412 and 414 inquire information provider 410 about the content of the event. Information provider 410 sends back the content of the event only to one of information verifiers 412 and 414 indicated in balance management blockchain 424.

Based on the content of the event, first information verifier 412 aggregates event notification transactions from event notification transaction pool 422 having the same content, and generates a single block. Information verifier 412 then sends the block to subsequent information verifier 414.

Subsequent information verifier 414 evaluates the validity of the event block from first information verifier 412. If subsequent information verifier 414 determines the event block from first information verifier 412 to be a valid block, subsequent information verifier 414 adds the block to event management blockchain 428.

In this manner, event management blockchain 428 contains only those incident event reports that have undergone the verification process. As event notification transactions continue to be generated for the same event, each verified event block is added to the event management blockchain 428. As event management blockchain 428 continues to grow through the additional verified blocks, the size of event management blockchain 428 becomes an indication of the reliability of the information contained therein.

Event management blockchain 428 may be a distributed ledger dedicated for managing event information related to specific relevant incident events. Event management blockchain 428 may be accessed by information subscriber 416. In the describing embodiment, the event management blockchain 428 may include one or more verified event blocks, each of which may include a verified incident event related to the incident event, issued by one or more of information provider 410, first information verifier 412, and subsequent information verifier 414. The verified incident events that are associated with the same or similar places may be identified as relevant incident events and recorded in the same event management blockchain 428. Event management blockchain 428 may be created in response to the first recognition of the relevant incident event and eliminated in response to clearance of the incident event.

Information subscriber 416 may be one of vehicles 304, 306, 380 and 310 shown in FIG. 3. Information subscriber 416 may subscribe to verified event information contained within event management blockchain 428. In this illustrative example, information subscriber 416 acquires the reference authority for event management blockchain 428 by issuing a fee transaction. The fee transaction is stored in remittance transaction pool 426, and undergoes a verification process similar to that of remittance transactions submitted by subsequent information verifier 414. Information subscriber 416 is permitted access to event management blockchain 428 only when the fee transaction is verified.

In response to arriving at the place of an incident event, other vehicles, such as vehicles 306, 308, and 310 of FIG. 3 may check whether a current state of the incident event is consistent with information originally reported. In response, the other vehicles can themselves become information provider 410, by submitting a subsequent incident event report that provides a state update for the incident event. The incident event report can go through a verification process similar to that described above. Information verifiers 412 and 414 compare the contents of multiple event notification transactions, and determine whether the state has changed. Then, information verifiers 412 and 414 select only event notification transactions that can be presumed to have reflected the most recent state, and add a block to event management blockchain 428.

In one illustrative example, the blocks added to event management blockchain 428 may indicate an elimination of the event. When blocks in event management blockchain 428 for the notification of the elimination of the event are continued by a certain number or more, first information verifier 412 generates a final block that includes an "event elimination declaration" transaction and any remaining event notification transactions. Upon validation by subsequent information verifier 414, the final block is added to event management blockchain 428.

When the final block is added to event management blockchain 428, an information provision reward, an event verification reward and an information reference fee are determined based on fees submitted by information subscriber 416. After generating the final event block, first information verifier 412 generates a remittance transaction for distributing the total of fees collected from information subscriber 416. Similar to the process above, remittance verifiers 418 and 420 confirm that the event management blockchain ends with the event elimination declaration transaction and the remittance transaction for reward distribution is generated by the issuer of the elimination declaration transaction. If there is no wrong in the remittance amount, remittance verifiers 418 and 420 organize the remittance transactions for reward distribution into a block, and add the block to balance management blockchain 424. The rewards acquired by the information provider 410 and information verifiers 412 and 414, as well as fees paid by information subscriber 416 are recorded in the balance management blockchain. Thereafter, event management blockchain 428 is discarded.

Figure 5:
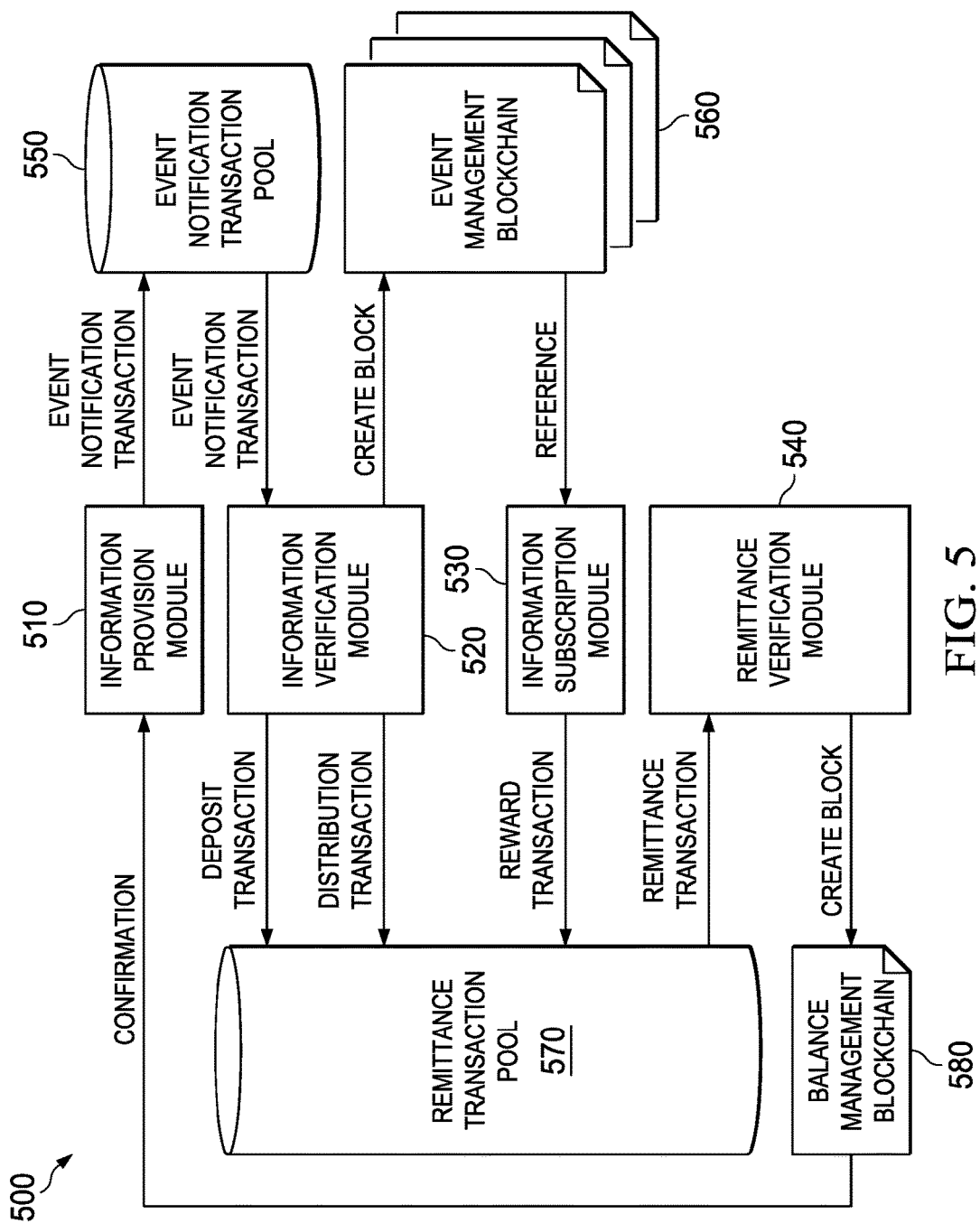
FIG. 5 is an illustration of a schematic of components of an event sharing system implemented on a mobile apparatus depicted according to an illustrative embodiment.

With reference now to FIG. 5, an illustration of a schematic of components of an event sharing system implemented on a mobile apparatus is depicted according to an illustrative embodiment. In this illustrative example, mobile sharing system 500 includes components of an event sharing system, such as event information sharing system 218 of FIG. 2, implemented in a mobile apparatus, such as one of vehicles 304, 306, 308, and 310 of FIG. 3.

Mobile sharing system 500 may include a number of components. As depicted, mobile sharing system 500 includes the information provision module 510, information verification module 520, information subscription module 530, and remittance verification module 540.

Information detection module 510 may be configured to detect a local event and its event content. Detection of the local event and identification of the event content of the detected local event can be done by using any known techniques that may use vehicle mounted sensors, cameras, etc. Information provision module 510 may be further configured to report an incident event transaction through the P2P network when detecting the local event, in accordance with a predetermined report policy.

The predetermined report policy may describe conditions for reporting incident event transactions as an information provider 410 of FIG. 4. Each incident event transaction may include a place of the local event, time of the event, and a signature of the mobile apparatus as an issuer. The place may be specified by GPS (Global Positioning System) coordinate (i.e., longitude and latitude), address or name of road (e.g., U.S. ROUTE 66) with segment information. Event notification transactions submitted from information provision module 510 are stored in event notification transaction pool 550. Event notification transaction pool 550 is an example of pool for unidentified incident event pool 422 of FIG. 4.

Information verification module 520 may be configured to obtain an incident event transaction from event notification transaction pool 550, which may be reported by another mobile apparatus that works as an information provider, such as information provider 410 in FIG. 4. Information verification module 520 may also be configured to communicate with a nearby mobile or immobile apparatus that works as subsequent information verifier 414. The communication for generating the verification may be conducted by using a short-range wireless communication unit, which may be typically used for vehicle-to-vehicle and/or vehicle-to-infrastructure communications if the mobile apparatus containing mobile sharing system 500 is a ground vehicle. Information verification module 520 may be configured to issue a verification transaction through network 302 of FIG. 3.

Information verification module 520 may be configured to receive one or more event notification transactions from event notification transaction pool 550. Information verification module 520 may also be configured to try to verify the one or more verification transactions in terms of physical (geographical) consistency with other verification transactions. Each verification transaction may indicate an encounter between other mobile apparatuses that may work as subsequent information verifier 414 of FIG. 4.

Information verification module 520 may be further configured to create a verification block in event management blockchain 560 if the received verification transactions are successfully verified. The verification block may include one or more verified verification transactions. In the describing embodiment, a proof-of-work model may be employed to impose a task of a given challenge level for creating a new verification block.

After successfully creating the verification block under the given challenge level, information verification module 520 may publish the newly created verification block in order to add it in onto event management blockchain 560. Additionally, information verification module 520 may be configured to receive a verification block published by mobile devices. Information verification module 520 may therefore also be configured to validate the received block and add it onto event management blockchain 560.

Information verification module 520 may be further configured to issue deposit transactions, which are stored in remittance transaction pool 570. Remittance transaction pool 570 is an example of remittance transaction pool 426 of FIG. 4. The remittance transaction issued by information verification module 520 is for the concession of virtual currency for participating in the verification of events detected by information provision module 510.

Information verification module 520 may be further configured to issue distribution transactions, which is stored in remittance transaction pool 570. The distribution transaction issued by information verification module 520 is for the distribution of fees collected from information subscribers, such as information subscriber 416 of FIG. 4, for accessing information in event management blockchain 560. The distribution transaction can be issued by information verification module 520 in response to creating blocks in event management blockchain 560 that includes an event elimination declaration.

Information subscription module 530 may be configured to select a remote incident event of interest from among validated incident events in the P2P network. Each validated incident event may be associated with a respective incident event blockchain 560. The selection of the remote incident event may be done in accordance with a predetermined subscription policy, which may describe conditions for subscribing to event information. In one illustrative example, validated incident events relating to a scheduled or estimated route may be subscribed automatically or manually.

A mobile apparatus containing mobile sharing system 500 can utilize the obtained event information in a variety of forms. For example, the mobile apparatus can re-calculate a route by using up-to-date event information as dynamic routing. For example, the mobile apparatus can display a pop-up notification telling about event information, such as sightseeing information, parking status information, recklessly driven vehicle warning, and the like, on a car navigation screen. For example, the mobile apparatus can display congestion degree overlaying on a map of the car navigation screen.

However, utilization of the obtained event information may not be limited to the aforementioned examples. In other embodiments, the obtained event information can be used for geo-fencing, and other positional-information-related services.

When event notification transactions for a relevant incident event are issued continuously, an event block including a verified incident event may be added to event management blockchain 560 one after another. It can be thought that longer chains relating to the similar contents may be more reliable. On the other hand, a block closer to the end of the chain indicates more recent information since the state of the incident event may change (for example, hazard elimination or restriction expansion) as time proceeds. Therefore, the mobile apparatus can judge whether to use the information, in view of balance of newness and continuity of the event information.

Remittance verification module 540 may be configured to obtain transactions from remittance transaction pool 570, which may be reported by another mobile apparatus that works as an information verifier or information subscriber, such as information verifiers 410 and 412 or information subscriber 416 in FIG. 4. Remittance verification module 540 may be configured further to verify transactions from remittance transaction pool 570.

Remittance verification module 540 may be further configured to add blocks for verified transactions to balance management blockchain 580. Balance management blockchain 580 is an example of balance management blockchain 424 of FIG. 4.

Information provider 410, information verifier 412, and information subscriber 416, all shown in FIG. 4, have been described in the previous figures as different mobile devices. However, the aforementioned roles may be mutually interchangeable by using the components shown in FIG. 5 in a manner that depends on circumstances of the mobile apparatus.

Figure 6:
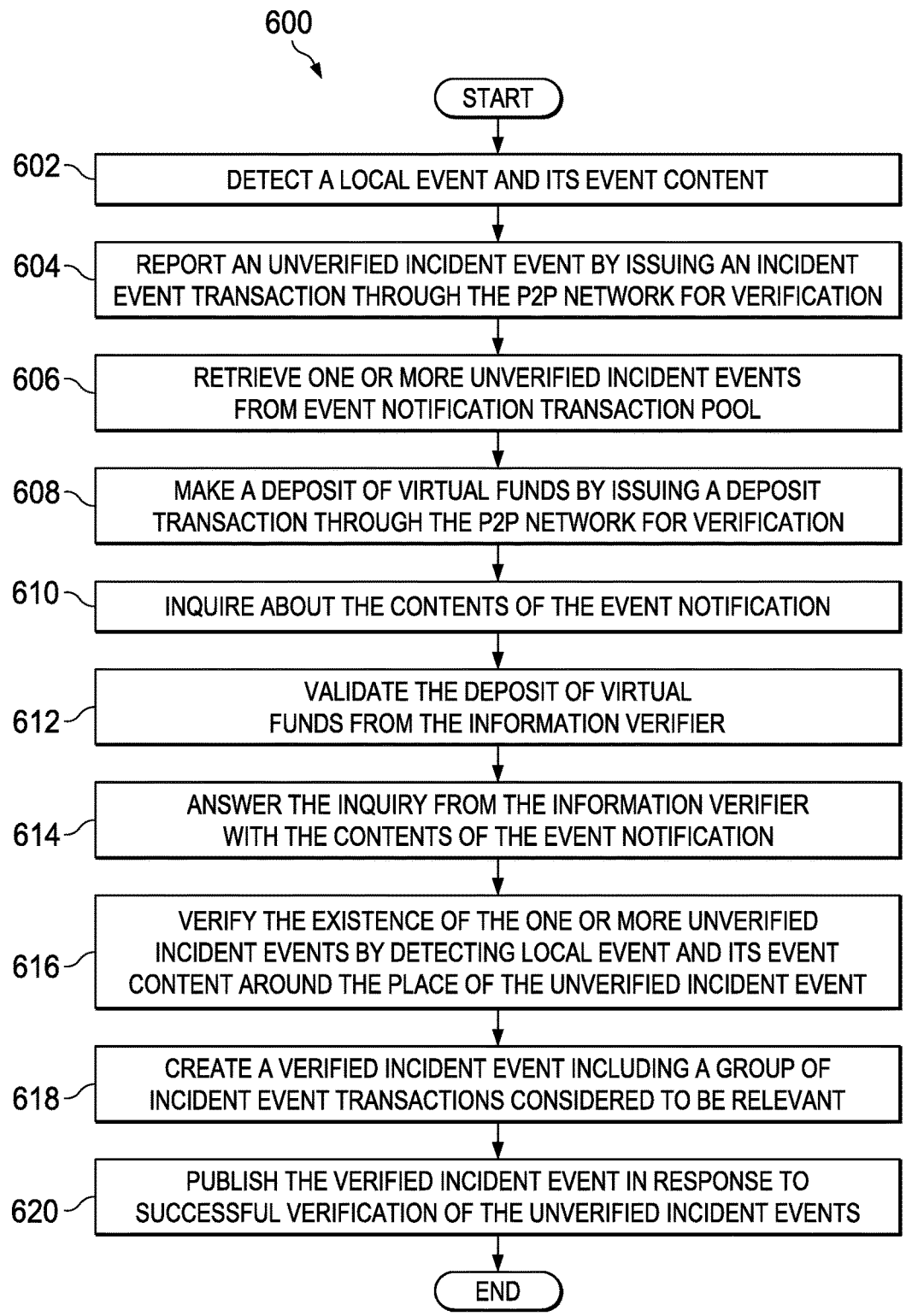
FIG. 6 is a sequence diagram depicting a process flow from detection of event information to publishing of verified event information depicted according to an illustrative embodiment.

With reference now to FIG. 6, a sequence diagram depicting a process flow from detection of event information to publishing of verified event information. In this illustrative example, process flow 600 shown in FIG. 6 may be performed between information provider 410 and information verifier 412 shown in FIG. 4.

At step 602, the information provider 410 may detect a local event and its event content. At step 604, information provider 410 may report an unverified incident event by issuing an incident event transaction through the P2P network for verification. At step 606, information verifier 412 may retrieve one or more unverified incident events from event notification transaction pool 422, each of which may be issued from a different respective information provider 410.

At step 608, information verifier 412 makes a deposit of virtual funds by issuing a deposit transaction through the P2P network for verification. At step 610, information verifier 412 inquires about the contents of the event notification at step 610.

At step 612, information providers 410, acting as remittance verifier 418, validates the deposit of virtual funds from information verifier 412. At step 614, once the deposit of virtual funds has been validated, information provider 410 answers the inquiry from information verifier 412 with contents of the event notification.

At step 616, information verifier 412 may verify the existence of the one or more unverified incident events by detecting a local event and its event content around the place of the unverified incident events. At step 618, information verifier 412 may create a verified incident event including a group of incident event transactions considered to be relevant.

At step 620, the information verifier 412 may publish the verified incident event in response to successful verification of the unverified incident events. Thereafter, the published event may be validated by a subsequent information verifier, such as information verifier 414 of FIG. 4, and added into an event management blockchain, such as event management blockchain 428 of FIG. 4, with the process terminating thereafter.

Figure 7:
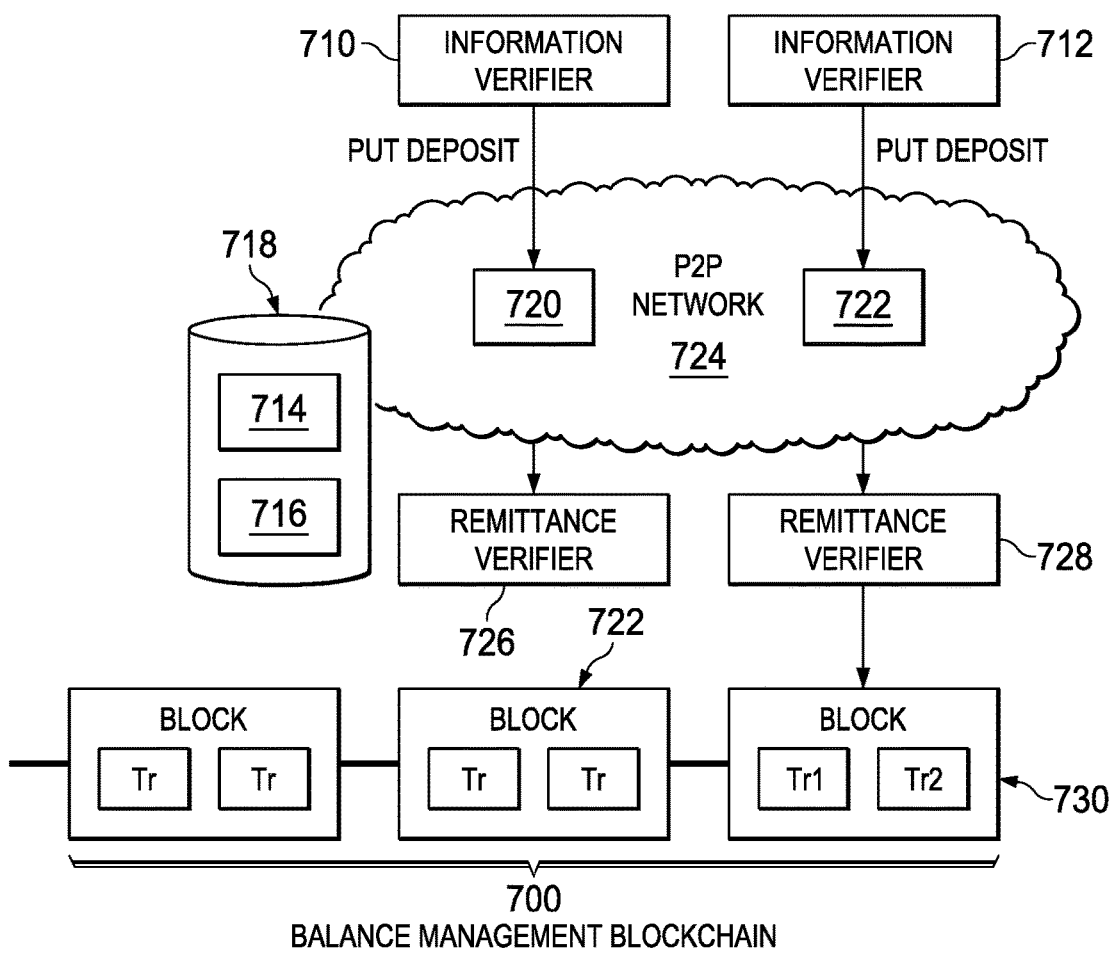
FIG. 7 is a data flow for adding a block to a balance management blockchain shown according to an illustrative embodiment.
Figure 8:
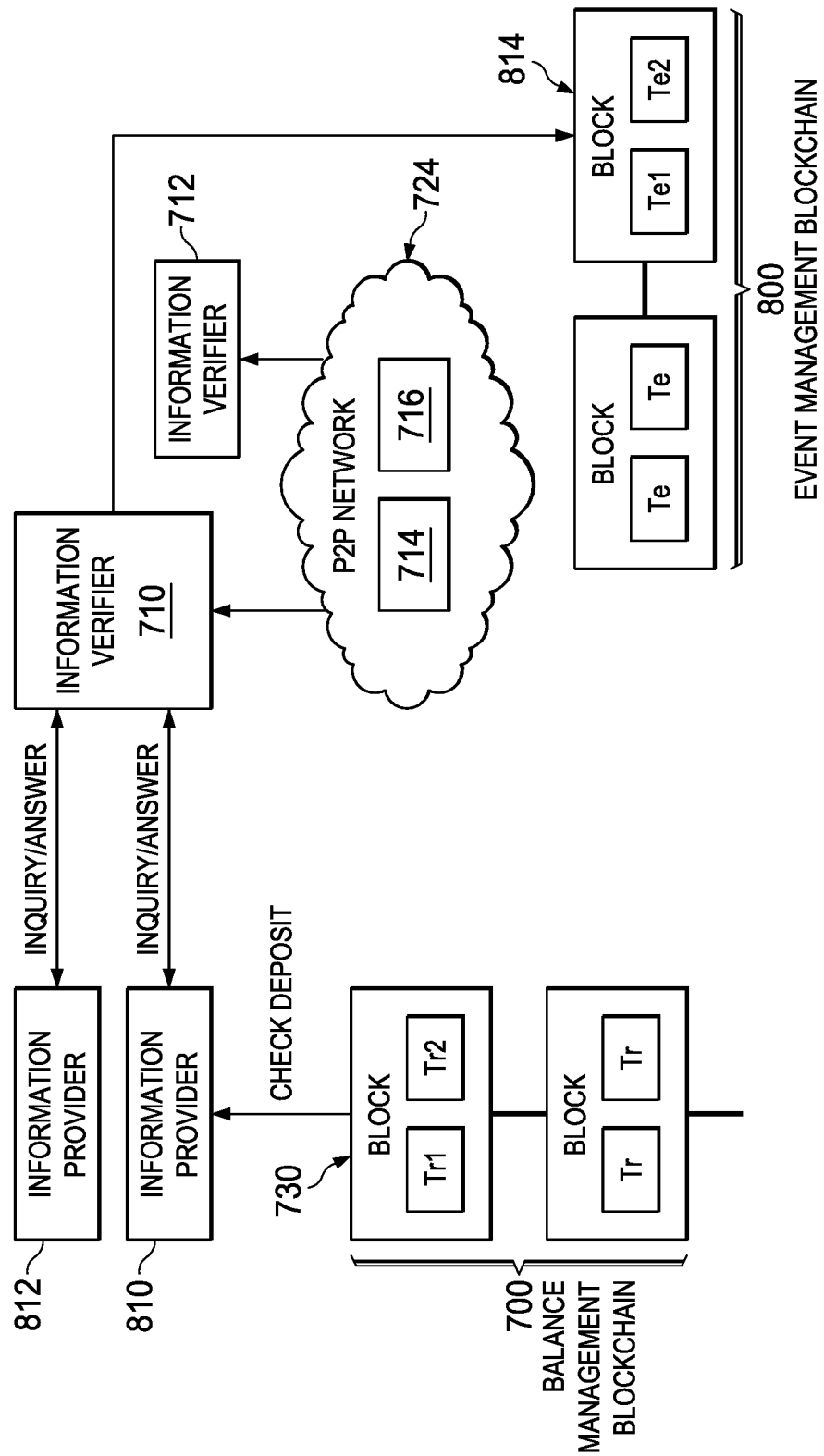
FIG. 8 is a data flow for adding a block to an event management blockchain shown according to an illustrative embodiment.

With reference now to FIG. 7, a data flow for adding a block to a balance management blockchain is shown according to an illustrative embodiment. As depicted, balance management blockchain 700 is an example of balance management blockchain 424 of FIG. 4.

Information verifiers 710 and 712 have requested access to information of event notification transactions 714 and 716 stored in event notification transaction pool 718. Information verifiers 710 and 712 and event notification transaction pool 718 are examples of information verifier 412 and event notification transaction pool 422, both shown in FIG. 4.

Event verifier 710 generates remittance transaction 720. Event verifier 712 generates remittance transaction 722. Remittance transaction 720 and remittance transaction 722 remit concession money for participating in the verification of information of event notification transactions 714 and 716. Remittance transactions 720 and 722 are submitted over P2P network 724, where they are received by remittance verifier 726 and 728, respectively.

Remittance verifiers 726 and 728 verify the individual remittance transactions 720 and 722, and generate block 730, which includes only transactions with no insufficient-fund and no wrong. As depicted, remittance verifier 728 first succeeds in the generation of block 730, and thereafter sends block 730 to P2P network 724 for verification by remittance verifier 726. If remittance verifier 728 obtains consensus from verifier 726 regarding the validity of blocks 730, remittance verifier 728 adds block 730 to balance management blockchain 700. In this illustrative example, balance management blockchain 700 is held by each of remittance verifiers 726 and 728. The difficulty level (Proof-of-Work) of the block generation may be common in all verification nodes, or may vary depending on the past verification performance With reference now to FIG. 8, a data flow for adding a block to an event management blockchain is shown according to an illustrative embodiment. As depicted, event management blockchain is an example of event management blockchain 428 of FIG. 4.

After block 730 for the concession money remittance transaction is added to the balance management blockchain 700, information verifiers 710 and 712 inquire to information providers 810 and 812 about information of event notification transactions 714 and 716. Information providers 810 and 812 refer to balance management blockchain 700, and send back the content of the event only to the ones of information verifier 710 and 712 that issued the concession money remittance transaction, as indicated in block 730.

Information verifiers 710 and 712 collect the event notification transactions 714 and 716 having the same content, and generate block 814. As depicted, information verifier 710 first succeeds in the generation of the block 814. Based on its first generation of block 814, information verifier 710 obtains the right to receive a reward of virtual currency for verification success. Information verifier 710 sends block 814 to P2P network 724 for verification by information verifier 712.

If information verifier 710 obtains consensus from information verifier 712 regarding the validity of block 814, information verifier 710 adds block 814 to the event management blockchain 800.

Figure 9:
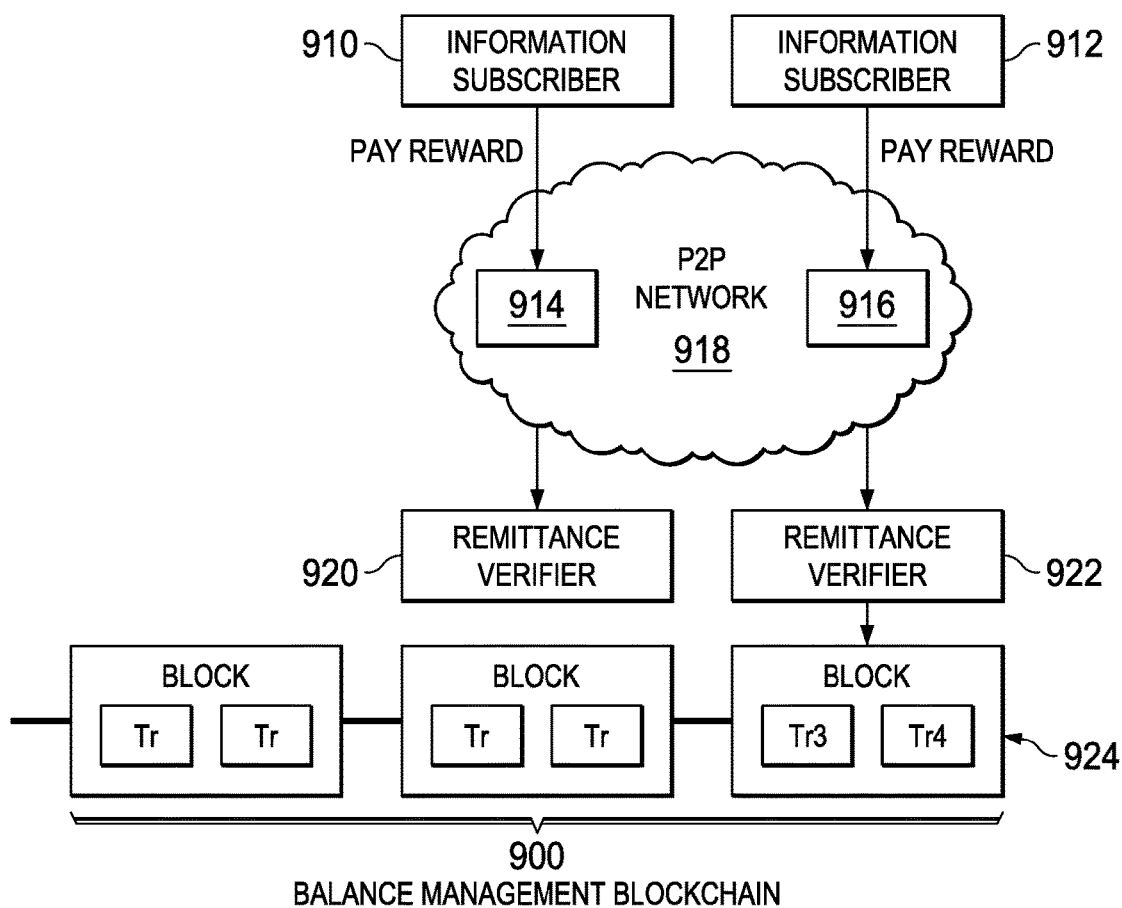
FIG. 9 is a data flow for adding a block to a balance management blockchain shown according to an illustrative embodiment.
Figure 10:
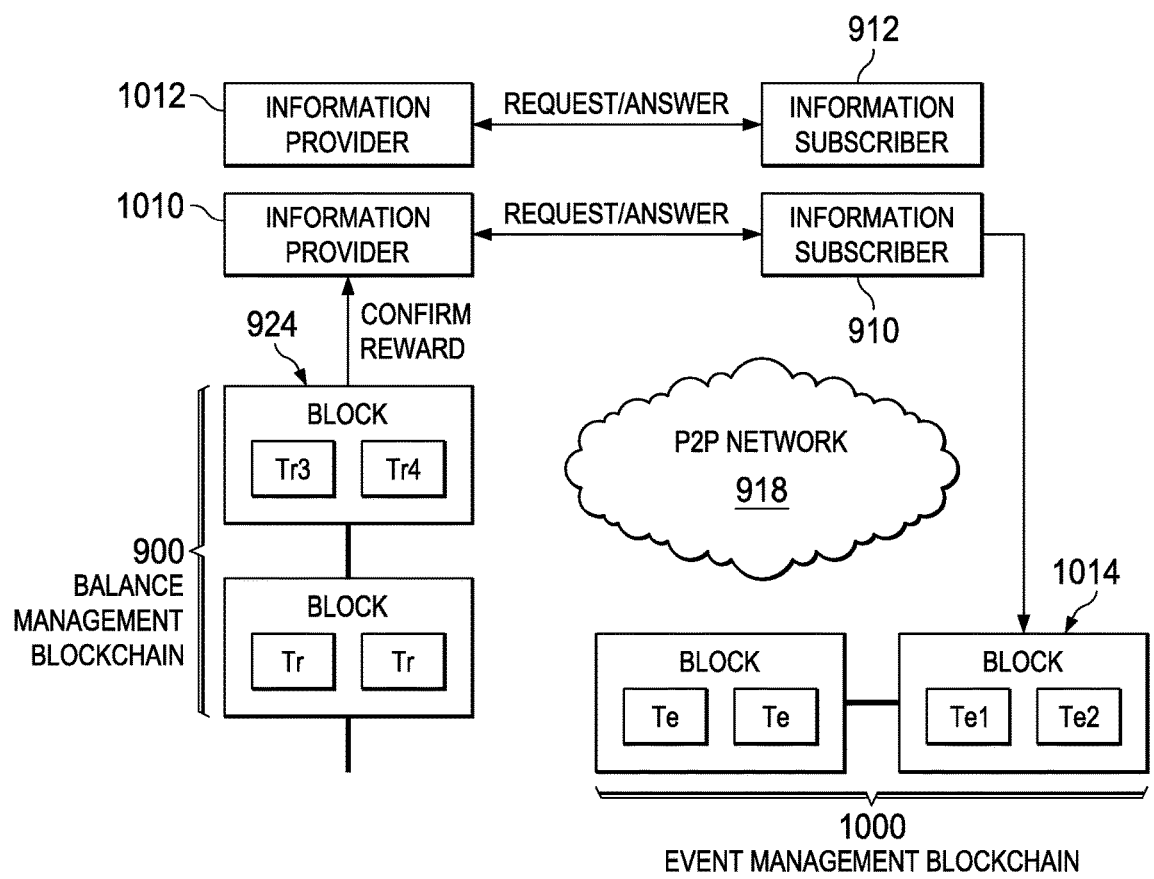
FIG. 10 is a data flow for adding a block to an event management blockchain shown according to an illustrative embodiment.

With reference now to FIG. 9, a data flow for adding a block to a balance management blockchain is shown according to an illustrative embodiment. As depicted, balance management blockchain 900 is an example of balance management blockchain 424 of FIG. 4.

Information subscribers 910 and 912 have requested access to information about a verified event. Information subscribers 910 and 912 are examples of information subscriber 416 shown in FIG. 4.

Information subscriber 910 generates remittance transaction 914. Information subscriber 912 generates remittance transaction 916. Remittance transaction 914 and remittance transaction 916 remit concession money for accessing information regarding verified events. Remittance transaction 914 and 916 are submitted over P2P network 918, where they are received by remittance verifier 920 and 922, respectively.

Remittance verifiers 920 and 922 verify the individual remittance transactions 914 and 916, and generate block 924, which includes only transactions with no insufficient-fund and no wrong. As depicted, remittance verifier 922 first succeeds in the generation of block 924, and thereafter sends block 924 to P2P network 918 for verification by remittance verifier 920. If remittance verifier 922 obtains consensus from verifier 920 regarding the validity of block 924, remittance verifier 922 adds block 924 to balance management blockchain 900. In this illustrative example, balance management blockchain 900 is held by each of remittance verifiers 920 and 922. The difficulty level (Proof-of-Work) of the block generation may be common in all verification nodes, or may vary depending on the past verification performance With reference now to FIG. 10, a data flow for adding a block to an event management blockchain is shown according to an illustrative embodiment. As depicted, event management blockchain 1000 is an example of event management blockchain 428 of FIG. 4.

After block 924 for the concession money remittance transaction is added to the balance management blockchain 900, information subscribers 910 and 912 inquire to information providers 1010 and 1012 about verified information of in event management blockchain 1000. Information providers 1010 and 1012 refer to balance management blockchain 900, and send back the content of the event only to the ones of information subscribers 910 and 912 that issued the concession money remittance transaction, as indicated in block 924.

In this illustrative example, information subscribers 910 and 912 select an arbitrary one of the event notification transactions recorded in event management blockchain 1000, and inquire to the information provider about the content of the event. As depicted, information subscriber 910 selects block 1014 from event management blockchain 1000, and inquires with information provider 1010 about the content. Information provider 1010 refers to balance management blockchain 900 to confirm that information subscriber 910 has issued the fee remittance transaction, as recorded in block 924. Information provider 1010 sends information subscriber 910 back the content of the event only if information subscriber 910 is indicated in block 924 of balance management blockchain 900. As depicted, information subscriber 912 similarly acquires the content of the event, from information provider 1012. The certain number or more of reference requests may be rejected, for avoiding requests by receivers from being excessively concentrated on a particular information provider.

If information verifier 910 obtains consensus from information verifier 912 regarding the validity of block 1014, information verifier 910 adds block 1014 to event management blockchain 1000.

Figure 11:
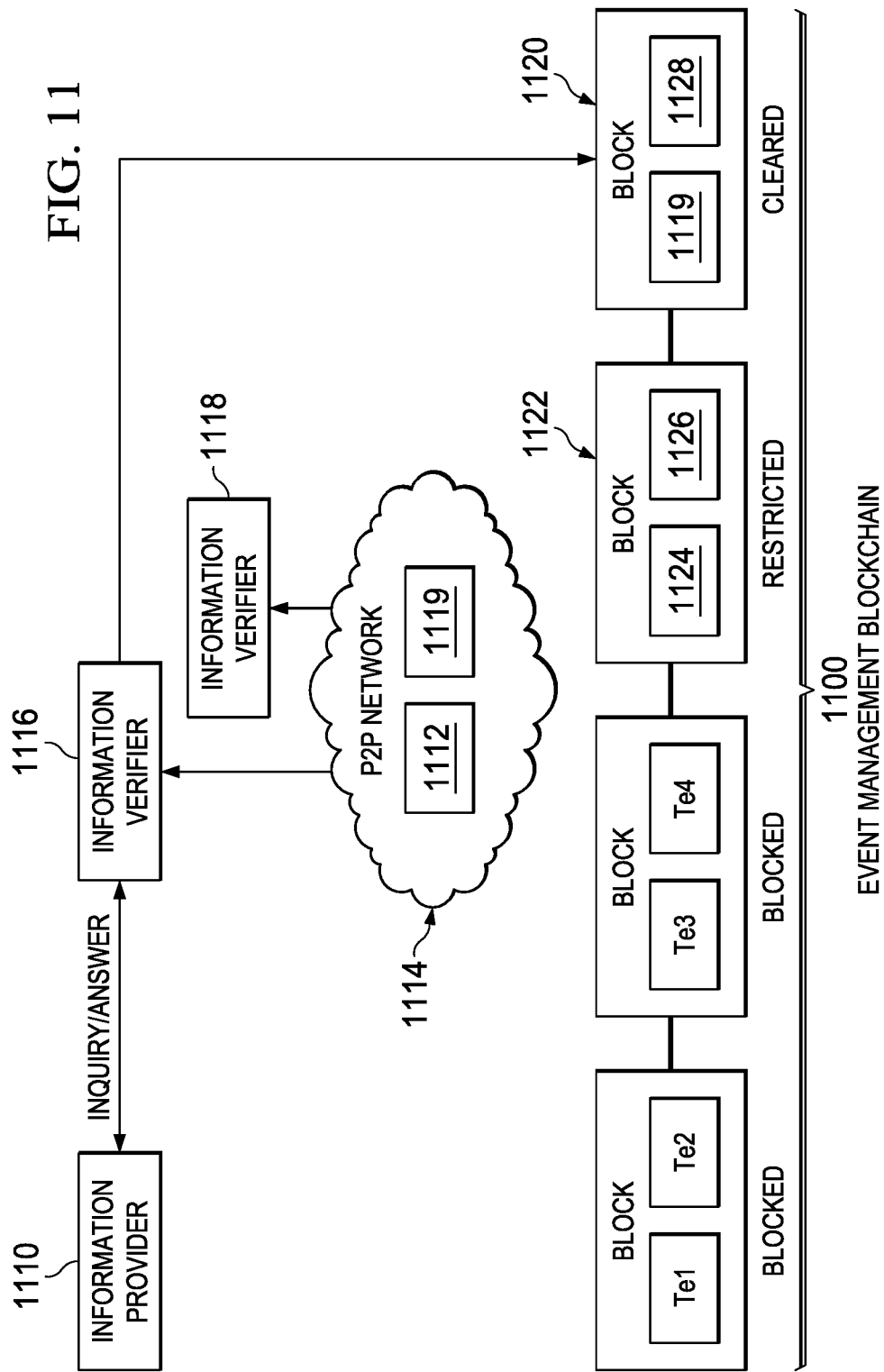
FIG. 11 is a data flow for adding a final block to an event management blockchain shown according to an illustrative embodiment.

With reference now to FIG. 11, a data flow for adding a final block to an event management blockchain is shown according to an illustrative embodiment. As depicted, event management blockchain 1100 is an example of event management blockchain 428 of FIG. 4.

When the state of an event changes as time proceeds, such as event 314 of FIG. 3, for example, by elimination of a hazard or expansion of restriction), information providers send event notification transactions including information regarding the change in state of the event, to the P2P network.

In this illustrative example, information provider 1110 has sent event notification transaction 1112 to P2P network 1114. In this illustrative example, event notification transaction 1112 is a state change, indicating that the event has cleared. Information verifiers 1116 and 1118 compare the contents of multiple event notification transactions, including event notification transaction 1112. Information verifiers 1116 and 1118 judge whether the state has changed. Information verifier 1116 selects only event notification transaction 1119 that can be presumed to have reflected the most recent state, and add block 1120 to event management blockchain 1100.

In this illustrative embodiment, block 1122 includes event notification transactions 1124 and 1126. Event notification transaction 1124 and 1126 also indicate that the event has cleared. When event notification transactions indicating an elimination of the event are continued by a certain number or more, information verifier 1116 generates block 1120 that includes an event elimination declaration transaction 1128 together with remaining event notification transactions 1119. Based on consensus and approval from the other information verifiers, including information verifier 1118, similar to a process described above, information verifier 1116 adds block 1120 to event management blockchain 1100. In this illustrative embodiment, block 1120 is the final block in event management blockchain 1100.

Figure 12:
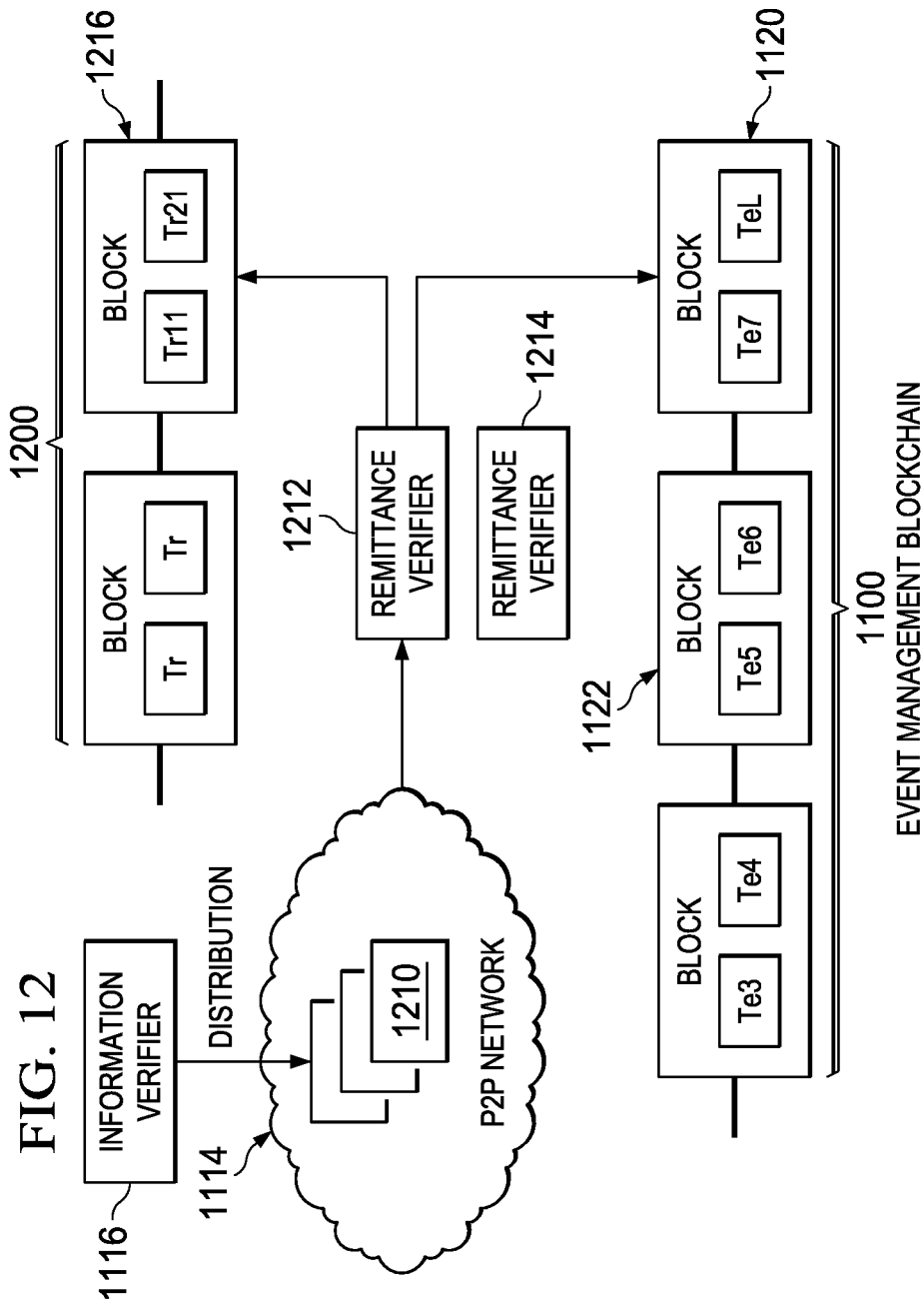
FIG. 12 is a data flow for adding a final block to a balance management blockchain shown according to an illustrative embodiment.

With reference now to FIG. 12, a data flow for adding a final block to a balance management blockchain is shown according to an illustrative embodiment. As depicted, balance management blockchain 1200 is an example of balance management blockchain 424 of FIG. 4.

When blocks for an event elimination state, such as block 1120 and 1122, are continued by a certain number, and information provision reward, an event verification reward and an information reference fee are adjusted. A certain fee is collected from the receivers and is distributed to the event verifiers and the information providers. The rewards acquired by the event verifiers and the information providers and the fees paid by the receivers are recorded in the balance management blockchain, and shared by all nodes. Thereafter, the event management blockchain is discarded.

In this illustrative example, information verifier 1116 has generated final block 1120 of event management blockchain 1110. Information verifier 1116 generates remittance transaction 1210 for distributing the total of the fees collected to the information providers and information verifiers indicated in event management blockchain 1110. Information verifier 1116 then sends remittance transaction 1210 to P2P network 1114.

The remittance verifiers 1212 and 1214 confirm that event management blockchain 1100 ends with block 1120 that includes the event elimination declaration transaction 1128. The remittance verifiers 1212 and 1214 confirm that there is nothing wrong in the remittance amount. Remittance verifiers 1212 and 1214 then organize the remittance transactions for reward distribution into block 1216, and add block 1216 to balance management blockchain 1200. Thereafter, event management blockchain 1100 is deleted from the P2P network 1114.

In the environment shown in FIG. 4, such event information may be useful in a geographically-limited area. In a conventional centralized management, even event information is geographically dependent, all event information would be collected from whole geographical areas, which may require a huge amount of storage space and lead network congestion.

In contrast to the conventional centralized management systems, such geographically-dependent information can be shared efficiently among a plurality of nearby mobile apparatus, according to the describing embodiment.

According to further the describing embodiment, the change in the state of the incident event may be recorded in the event management blockchain 428 in a nearly real time manner. It is possible to update the information more quickly than the conventional centralized management systems. The mobile apparatus can share the event information with a secure reliability, without providing a trusted third party. Therefore, it is possible to construct a system having a good fault tolerance at low cost. Also, since the event management blockchains 428 may be provided for each place, the information subscribers 416 merely needs to pay attention only to the event information in the surrounding areas.

By using two types of blockchains, including balance management blockchain 424 and event management blockchain 428, it is possible to prevent participants in the P2P network from tampering with information and reward submissions. Hence, reliability of the event information in the event management blockchain 428 can be improved.

Even if an erroneous incident event is reported due to a failure of a sensor or the like, no event block including the erroneous incident event would be generated or the chain of such blocks indicating similar states of incidents does not extend since subsequent information verifier 414 seldom detects same erroneous incident event. Consequently, such an erroneously detected event would be discarded from the P2P network, spontaneously.

Also, a scale and range of a geographic area under the charge of one P2P network can be designed without considering the number of mobile apparatus or the number of the incident events. That is because the number of the mobile apparatus that participates in the verification of the unverified incident event may be expected to increase as the number of the mobile apparatus located as the area increases, which may increase the number of the incident events occurring at the area. Thus, the load for verifying the incident event may be balanced among the participants in natural manner.

Figure 13:
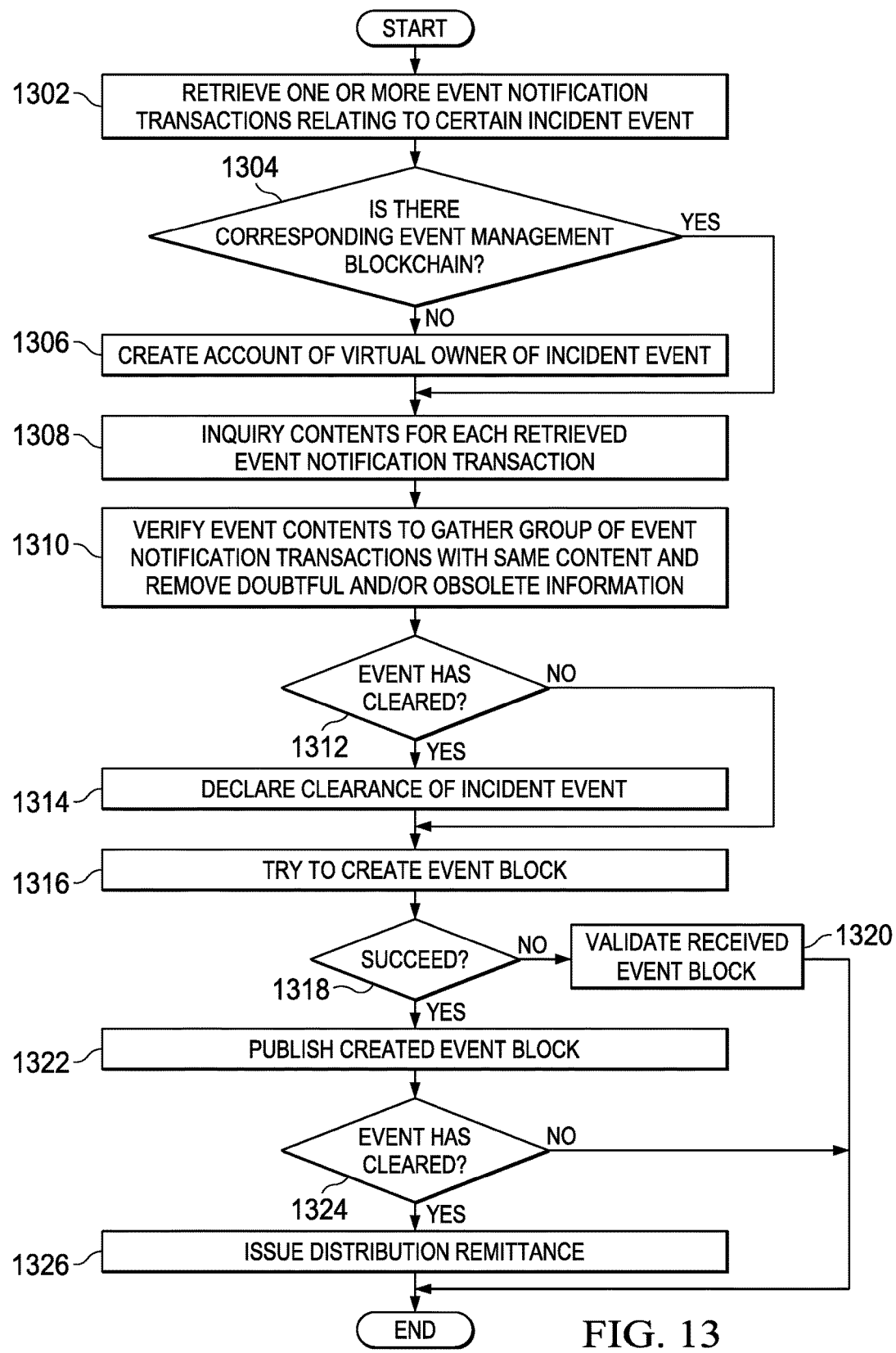
FIG. 13 is a flowchart depicting a process executed by the mobile apparatus for verifying event information, for detecting event information and for subscribing event information according to the exemplary embodiment of the present invention.

FIG. 13 is a flowchart depicting a process for verifying event information in accordance with an illustrative embodiment. The process shown in FIG. 13 may be performed by an information verifier, such as information verifier 412 shown in FIG. 4. The process shown in FIG. 13 may be implemented in an information verification module, such as information verification module 520 shown in FIG. 5. Process 1300 shown in FIG. 13 may begin in response to initiating the verification process according to the predetermined strategy.

In response to initiating the verification process according to the predetermined strategy, process 1300 retrieves one or more event notification transactions from among unverified event transactions (step 1302). The unverified event transactions can be event transactions retained in event notification transaction pool 422 of FIG. 4. The event notification transactions that are expected to be related to certain incident event may be retrieved by using information included in the event notification transactions. The information may be communicated to the information verifier from an information provider, such as information provider 410 of FIG. 4, in response to confirmation of a remittance transaction from the information verifier.

Process 1300 determines whether or not there is a corresponding event management blockchain for the incident event (step 1304). The event management blockchain is an event management blockchain, such as event management blockchain 428 of FIG. 4. In response to determining that there is no corresponding event management blockchain ("no" at step 1304), process 1300 may branch out to create an account of a virtual owner of the incident event (step 1306). In response to determining that there is the corresponding event management blockchain ("yes" at step 1304), process 1300 may proceed directly to step 1308.

Process 1300 inquires each event contents for each retrieved event notification transaction to the respective information provider (step 1308). The information provider can be information provider 410 of FIG. 4. As described above, first information verifier 412 may put a deposit to the account prior to the inquiring and obtain their event contents.

Process 1300 verifies event contents of the one or more event notification transactions to gather a group of event notification transactions with same or similar contents and remove doubtful and/or obsolete event notification transactions (step 1310).

As time proceeds, the state of the incident event would change (e.g., clearance, restriction mitigation, restriction expansion, etc.). In this case, a subsequent information provider may send event notification transactions relating to a different event.

As part of step 1310, process 1300 may try to detect a change of state in the incident event by analyzing the event contents to identify obsolete information. More specifically, process 1300 may compare the event contents of multiple event notification transactions, and determines whether or not the state of the incident event has changed. If so, first information verifier 412 may collect only event notification transactions that are presumed to reflect the most recent state.

Process 1300 may determine whether or not the incident event has been cleared by analyzing the event contents of the one or more event notifications (step 1312). In one illustrative embodiment, the process 1300 may determine that the incident event has been cleared if blocks that include event notification transactions indicating clearance of the incident event are continued by a certain number. In response to determining that the event has cleared ("yes" at step 1312), process 1300 declares clearance of the event (step 1314). In one illustrative embodiment, process 1300 declares clearance of the incident event by issuing an event notification transaction indicating clearance of the incident event, such as illustrated in the schematic of FIG. 11.

In response to determining that the event has not yet cleared ("no" at step 1312), process 1300 proceeds to the step 1316. Process 1300 may try to create a verified event block that includes the one or more event notification transactions with the same or similar event contents under given challenge level (step 1316). In one illustrative embodiment, if process 1300 declares the clearance of the incident event at step 1312 above, the verified event block is a final event block that includes an event clearance declaration transaction, such as event elimination declaration transaction 1128 of FIG. 11, together with remaining event notification transactions, such as event notification transactions 1119 of FIG. 11. When the verified event block is a final event block, information verifiers that add the event clearance declaration transaction may become final information verifiers.

Process 1300 then determines whether the creation of the verified event block is successful (step 1318). The procedure to obtain consensus may be same as that for other event blocks. Responsive to determining that the creation of the verified event block has failed ("no" at step 1318), process 1300 may branch to step 1320. Process 1300 may then validate other verified event blocks in response to receiving the other verified event block published by other information verifiers (step 1320), with the process terminating thereafter.

Returning now to step 1318, responsive to determining that the creation of the verified event block was successful ("yes" at step 1318), process 1300 may branch to step 1322. Process 1300 may then publish the verified event block (step 1322).

Process 1300 may again branch in a manner that depends on whether or not the incident event has been cleared (step 1324). If process 1300 determines that the incident event has not been cleared ("no" at step 1324), the process may terminate. If process 1300 determines that the incident event has been cleared ("yes" at step 1324), process 1300 may issue a distribution remittance transaction (step 1326), with the process terminating thereafter. In one illustrative embodiment, process 1300 may issue a distribution remittance transaction.

As described above, the subject matter, which is regarded as the invention, is distinctly claimed in the claims at the conclusion of the specification. However, the following methods, and associated mobile apparatus, computer systems and computer program products relating to the following method may also be disclosed herein.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function or functions. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for verifying event information to be shared among a plurality of mobile apparatuses, the method comprising:
   receiving, by an information verifier of the plurality of mobile apparatuses, an event notification issued from an information provider of the plurality of the mobile apparatus;
   verifying, by the information verifier, the event notification relating to an incident event; and
   creating, by the information verifier, a verified event block constituting an event management distributed ledger associated with an account, the account being used for collecting a reward from one or more information subscribers of the plurality of the mobile apparatus;
   wherein at least part of the reward collected into the account is distributed to the information verifier in response to clearance of the incident event.

2. The method of claim 1, wherein verifying the event notification comprises:
   inquiring, by the information verifier, an event content of the event notification from the information provider; and
   gathering, by the information verifier, a group of event notifications having event contents similar to the event content of the event notification.

3. The method of claim 2, further comprising:
   in response to successfully creating the verified event block, publishing, by the information verifier, the verified event block including the event notification and the group of the event notifications; and
   in response to unsuccessfully creating the verified event block, receiving the verified event block published by another information verifier and validating the verified event block.

4. The method of claim 2, wherein each event notification of the group of event notifications includes a place of an event, time of the event and a signature of an issuer.

5. The method of claim 2, wherein the verifying further comprises:
   prior to inquiring the event content, issuing, by the information verifier, a deposit remittance for participating in verification of the incident event, wherein the deposit remittance is issued to the account through a balance management distributed ledger.

6. The method of claim 5, wherein issuing the deposit remittance comprises:
   responsive to determining that there is no event management distributed ledger for the incident event, creating, by the information verifier, an account for the incident event.

7. The method of claim 2, wherein verifying the event notification further comprises:
   analyzing, by the information verifier, the event contents of the group of event notifications to detect a change of state in the incident event; and
   wherein gathering the group of event notifications further comprises:
   gathering, by the information verifier, only ones of the group of event notifications that reflect a most recent state of the incident event.

8. The method of claim 1, wherein the method further comprises:
   in response to clearance of the incident event, distributing the reward among one or more participants related to the event management distributed ledger, wherein the one or more participants includes the information verifier.

9. The method of claim 8, wherein the distributing the reward further comprises:
   determining, by the information verifier, whether the incident event has been cleared;
   in response to determining that the incident event has been cleared, declaring, by the information verifier, clearance of the incident event in the event management distributed ledger; and
   issuing, by the information verifier, a distribution remittance for distributing the reward collected in the account.

10. The method of claim 9 further comprising:
adding a remittance block for the distribution remittance to a balance management distributed ledger after confirming that the event management distributed ledger includes the declaration of the clearance of the incident event issued by the information verifier.

11. A method for providing event information to be shared among a plurality of mobile apparatus, the method comprising:
in response to detecting a local event, issuing, by an information provider of the plurality of the mobile apparatuses, an event notification for verification through a network;
receiving, by the information provider, a reference request for event information about the local event from an information subscriber of the plurality of the mobile apparatus;
confirming, by the information provider, whether the information subscriber has remitted a reward to an account associated with an event management distributed ledger for the local event; and
in response to confirming that the reward has been remitted to the account, providing, by the information provider, an event content of the event notification to the information subscriber.

12. The method of claim 11, wherein the method further comprises:
receiving, by the information provider, an inquiry about the event notification from an information verifier of the plurality of the mobile apparatus;
determining, by the information provider, whether a deposit has been remitted from the information verifier to the account; and
in response to determining that the deposit has been remitted, answering, by the information provider, the inquiry from the information verifier with the event content of the event notification.

13. The method of claim 12, wherein determining that the deposit has been remitted further comprises:
determining, by the information provider, whether a reward remittance from the information subscriber is recorded in a balance management distributed ledger for the account;
wherein confirming that the reward has been remitted to the account comprises:
determining whether a deposit remittance from the information verifier to the account is recorded in the balance management distributed ledger.

\* \* \* \* \*